June 11, 1940. H. W. BRUKER 2,204,067
CUTTING MACHINE
Filed Dec. 21, 1938

INVENTOR
Hobart W. Bruker
BY
Ward Crosby & Neal
ATTORNEYS

Patented June 11, 1940

2,204,067

UNITED STATES PATENT OFFICE 2,204,067

CUTTING MACHINE

Hobart W. Bruker, Bordentown, N. J., assignor to George W. Swift, Jr. Inc., Bordentown, N. J., a corporation of New Jersey Application December 21, 1938, Serial No. 247,005

10 Claims. (Cl. 164—68)

The invention relates more particularly to cutting machines of the continuously driven type wherein the machine is so constructed that adjustment may be made thereof while running, to produce blanks of different desired lengths from material fed continuously through the machine, and wherein adjustments are made to keep the cutting speed of the cutter substantially equal to the rate of travel of the material being cut, when the machine is set for different lengths of cut.

The primary object of the invention is to provide a machine of the above character which will markedly reduce the time consumed during periods when the machine is being adjusted to change from one length of cut to another. Further objects and advantages of the invention will be in part obvious and in part more specifically referred to in the description hereinafter contained which, taken in conjunction with the accompanying drawing, discloses a machine constructed to operate in accordance with the invention. In the drawing—

Figures 1, 2:
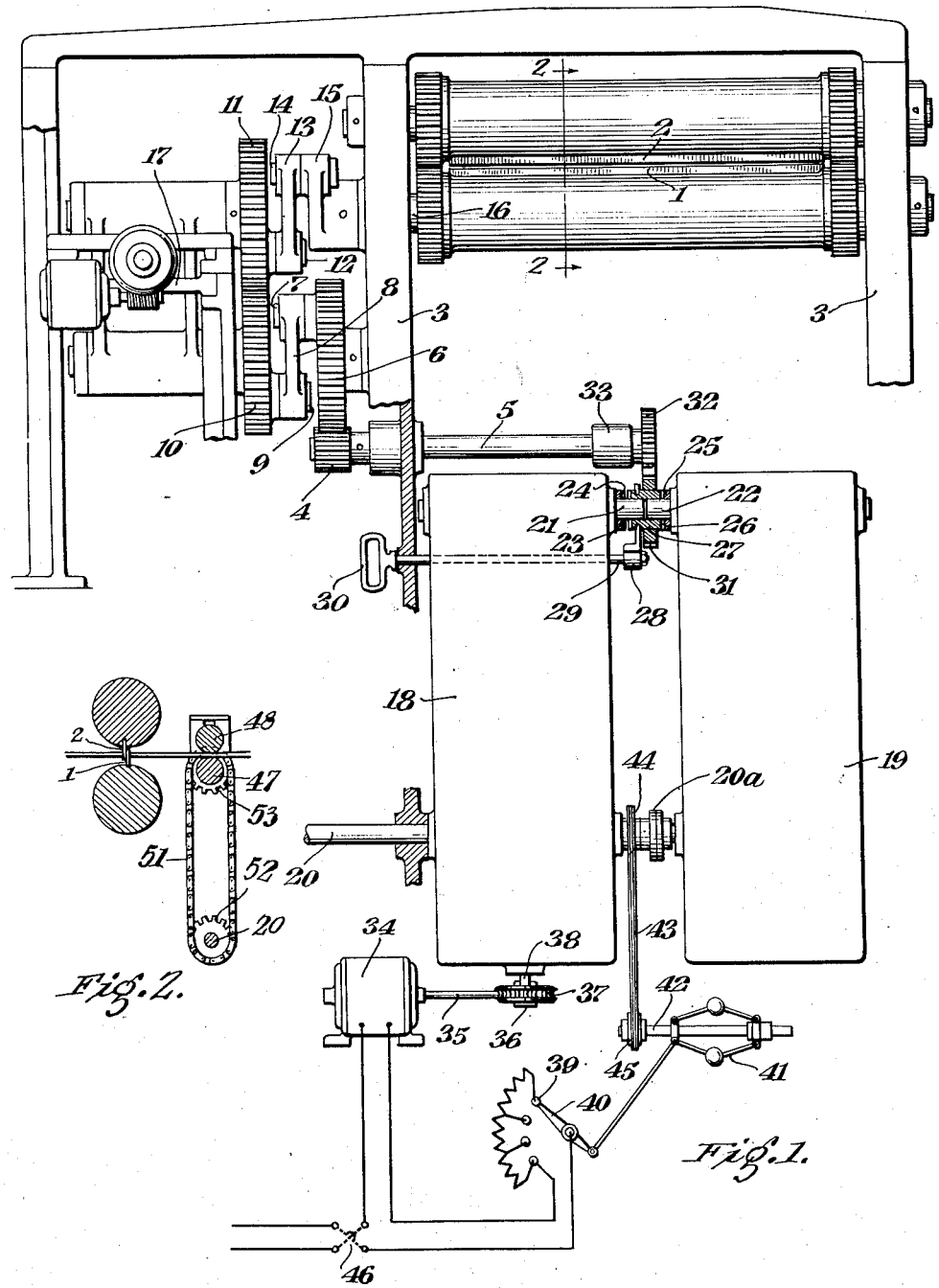
Fig. 1 is a schematic view wherein different operating parts of a machine constructed to operate in accordance with the invention, are shown separately from various structural details which will usually be used in conjunction with them, in order to enable the main operating features of the machine to be more readily understood.
Fig. 2 is a schematic section taken on line 2—2 of Fig. 1.

In the manufacture of corrugated paper board and so-called fibre board, it has long been the practice to use at the delivery end of the machine which makes the paper board, a cut-off mechanism which receives the continuously advancing material from the making machine and cuts it into blanks of a length depending upon the use to which the material is to be put. Various cut-off machines have been designed for the above and similar purposes which are capable of being adjusted while the machine is running and without interfering with the continuous feed of the material through it, to produce blanks of different selected lengths, and are also capable of being adjusted under similar conditions of operation to conform the cutting speed of the cutter to the speed of travel of the material, for different lengths of cut. The adjustment of the length of cut has been accomplished by the use of a variable speed transmission such as the so-called Reeves drive which may control either the frequency of operation of the cutter or the speed of travel of the material, while the adjustment of the cutting speed has been made by suitable motion modifying devices in the driving mechanism of the cutter such as adjustable differential cranks, elliptical gears in conjunction with various devices for adjusting the angularity between the operating phase of the cutters and the elliptical gears, etc.

It frequently happens in machines of the above nature that the time consumed in making the adjustment for length of cut is substantially greater than that required for making the corresponding adjustment in cutting speed. For example, the adjustment of a Reeves drive to regulate the length of cut may require about half a minute, while the adjustment of a cutting speed regulating mechanism of the character set forth in my copending application Serial Number 185,837, filed January 20, 1938, requires only a second or two. The extra time required for the adjustment in length of cut accordingly is substantial, and when made under circumstances where the material is being fed continuously through at a speed which may be of the order of 300 feet a minute, upwards of 100 feet of material may be cut into undesired odd lengths during the adjusting operation. The wastage of material is particularly high when the machine is being adjusted from short to long lengths of cut.

The invention is illustrated as applied to a cutting machine which in respect to many of its parts may be understood as similar in construction and mode of operation to the machine disclosed in the patent to George W. Swift, Jr. No. 2,059,412 issued November 3, 1936, except for the mechanism used to regulate the length of cut. In other words, the present invention is not particularly concerned with the details of the mechanism used to regulate the cutting speed, in fact the features of the present invention would still be theoretically useful if no cutting speed regulating mechanism at all were employed. For present purposes it will be sufficient to note that the disclosed machine has rotary cutters 1 and 2 suitably journaled in uprights 3, and driven through a train of gearing including a pinion 4 fixed to a rotary spindle 5, a gear 6 having a crank pin 7 thereon, a link 8 pivotally connecting the crank pin 7 with a similar crank pin 9 on gear 10, a gear 11 meshing with gear 10 and carrying a crank pin 12, and a link 13 similar to link 8 which is pivotally connected at its opposite ends respectively to crank pin 12, and a further crank pin 14 on crank arm 15, which latter is fixed to the shaft 16 which drives the cutter 1. The gears 10 and 11 may be mounted on a slide 17 (similar to the member 27 of the above mentioned Swift patent) which may be adjusted in position to regulate the cutting speed of the cutters. The above described parts are to be regarded as merely illustrative of some suitable mechanism for regulating the cutting speed, and as previously stated mechanisms of the above nature are known which will enable the cutting speed to be adjusted in a second or two, through the range usually afforded in machines of the type under discussion.

In accordance with one aspect of the present invention, I provide the machine with a plurality of variable speed transmissions, which may be selectively connected with and disconnected from the train of gearing which drives the cutter, so that while the machine is being operated by one of the variable speed transmissions to produce blanks of a given length, another of the variable speed transmissions which is idle, may be adjusted to the proper setting for the different length of blanks which is next to be cut. Then upon completion of the first mentioned run of blanks, the machine may be practically instantly shifted to disconnect the correspondingly set variable speed transmission from the cutters, and connect in the variable speed transmission which has already been properly set as above described for the length of blank next to be cut. In this way the adjustment may be made without stopping the machine or interrupting the travel of the material to be cut through it, and the production of odd length blanks between runs will be reduced to a minimum.

In the illustrated form of the invention two variable speed transmissions 18 and 19 are shown, which may be understood as typifying the so-called Reeves drive, a power input shaft 20 driving the transmission 18 and also the transmission 19 through the medium of a coupling 20a, so that the transmissions are both normally in motion at all times when the machine is running. The U. S. patent to G. W. Swift, Jr., No. 1,951,536 dated March 20, 1934, may be referred to as showing a variable speed transmission of the type above referred to. The output shafts 21 and 22 respectively of such transmissions however are selectively connected to the spindle 5 above mentioned by suitable clutch mechanism. As shown the shaft 21 has fixed to it a clutch collar 23 having axial teeth 24, and the output shaft 22 has fixed to it a similar clutch collar 25 having axial teeth 26. A clutch sleeve 27 is slidable along the shafts 21 and 22 by the aid of suitable adjusting mechanism such as the yoke 28, rod 29 and handle 30, and this sleeve 27 has fixed to it a pinion 31 which meshes with a gear 32 on the adjacent end of spindle 5, which latter may have a suitable fixed bearing 33. In the position shown the transmission 18 is idling, and transmission 19 is driving the cutters through the clutch and gear train above described. While the cutter is thus operating, transmission 18 may be adjusted to the proper setting for the length of blank next to be cut after the current run is completed, and upon the completion of the current run, handle 30 is operated to disconnect transmission 19 from the cutters and connect transmission 18 to the cutters. Preferably both transmissions are kept continuously in motion, to facilitate their adjustment from one setting to another, as well as to ease the strain on the machine incident to shifting rapidly from one length of cut to another.

The invention in another of its aspects enables material reductions to be obtained in the time taken up in shifting the variable speed transmission from one setting to another. In machines of the type under discussion the speed of rotation of the input shaft 20 will bear a fixed relation to the speed of travel of the material to be cut through the machine, as is well known in the art, and accordingly need not be described in detail. Fig. 2 indicates such an arrangement schematically, the feed rolls 47 and 48 being utilized to advance the web to be cut to the knives 1 and 2, and the feed roll 47 being driven from shaft 20 by means of a chain 51 cooperating with sprockets 52 and 53 respectively fastened to shaft 20 and feed roll 47. These rolls 47 and 48 should be regarded as merely typical of suitable devices forming part of the machine or located in advance of it, for continuously feeding the material to be cut past the cutters. And for reasons also well known in the art, it frequently is desired to feed the material to be cut through the machine at a faster or slower rate, thus correspondingly affecting the speed of rotation of shaft 20.

I have found that the more rapidly the material to be cut is traveling through the machine, the faster may be the speed or rate of adjustment of the variable speed transmission from one setting to another; in other words, if material is passing through the machine at the rate of say 300 ft. per minute, it is feasible to adjust the variable speed transmission much more rapidly than if the speed of feed were 150 ft. per minute, and accordingly I prefer to so coordinate the mechanism for adjusting the setting of the variable speed transmission with suitable moving parts of the machine that the speed of adjustment will be regulated automatically in accordance with the speed of feed.

In the illustrated embodiment of the invention the setting of the variable speed transmission 18 is adjusted by a motor 34 having a shaft 35 carrying a worm 36 which drives a worm gear 37 on shaft 38, which latter may be understood as altering the speed ratio between the shafts 20 and 21 in known manner. The speed of operation of motor 34 is shown as regulated by means of a resistance switch having fixed contacts 39 and a movable switch arm 40, which latter is automatically adjusted in position according to the speed of rotation of shaft 20. For this purpose a conventional centrifugal governor mechanism 41 is shown as connected to switch arm 40 by rod 42, the governor mechanism 41 being illustrated as carried by a rotary shaft 42 driven by a chain 43 and sprockets 44 and 45, on shafts 20 and 42 respectively. Since, as above mentioned, the speed of rotation of shaft 20 is proportional to the speed of feed of the material through the machine, the rate of adjustment of the setting of the variable speed transmission 18 will be proportionately altered when the speed of feed is changed. When the operator wishes to adjust the variable speed transmission 18 to a new setting, he closes the reversible switch 46 one way or the other, depending upon the direction in which the variable speed transmission is to be adjusted, and the parts above described automatically regulate the speed at which the adjustment is made. After the adjustment of the variable speed transmission has proceeded to the desired extent, switch 46 is opened, and it may of course be closed again whenever it is desired to make minor corrections in a setting previously made or to adjust the mechanism to a new setting. The mechanism above described, however, should be regarded as merely typical of devices suitable for the purpose, from the standpoint of the invention in its broader aspects, and while the invention has been disclosed as applied to a cut-off machine of the above described specific construction, it should also be understood that many changes may be made therein without departing from the invention in its broader aspects, within the scope of the appended claims.

I claim:

1. A cutting machine of the class described having in combination a cutter, means for progressively feeding material to be cut past said cutter, mechanism for regulating the cutting speed of the cutter to conform to different lengths of cut, said machine including a plurality of variable speed transmissions respectively adjustable to afford different lengths of cut, and means whereby said transmissions may be selectively connected into working relation with the cutter while the machine is running.

2. A cutting machine having in combination a cutter, means for progressively feeding material to be cut past said cutter, mechanism for regulating the cutting speed of the cutter to conform to different lengths of cut, a plurality of variable speed transmissions interposed between said feeding means and said cutting speed regulating mechanism, and clutches interposed respectively between said variable speed transmissions and said cutting speed regulating mechanism.

3. A cutting machine having in combination a cutter, means for progressively feeding material to be cut past said cutter, mechanism for regulating the cutting speed of the cutter to conform to different lengths of cut, a plurality of variable speed transmissions interposed between said feeding means and said cutting speed regulating mechanism, said variable speed transmissions having connections normally transmitting power to their input members, and clutches respectively interposed between the output members of said variable speed transmissions and said cutting speed regulating mechanism.

4. A cutting machine having in combination a cutter, means for progressively feeding material to be cut past said cutter, mechanism for regulating the cutting speed of the cutter to conform to different lengths of cut, a plurality of variable speed transmissions interposed between said feeding means and said cutting speed regulating mechanism, said variable speed transmission having connections normally transmitting power to their input members, clutches respectively interposed between the output members of said variable speed transmissions and said cutting speed regulating mechanism, and an operating member constructed and arranged to selectively connect and disconnect said clutches.

5. A cutting machine of the class described having in combination a cutter, means for progressively feeding material to be cut past said cutter, mechanism for regulating the cutting speed of the cutter to conform to different lengths of cut, a variable speed transmission adjustable to afford different lengths of cut, mechanism for adjusting said variable speed transmission, and means for regulating the speed of action of said last mentioned mechanism upon said variable speed transmission.

6. A cutting machine of the class described having in combination a cutter, means for progressively feeding material to be cut past said cutter, mechanism for regulating the cutting speed of the cutter to conform to different lengths of cut, a variable speed transmission adjustable to afford different lengths of cut and means adjustable in accordance with the speed of operation of said material feeding means for altering the speed of action of said adjusting mechanism upon said variable speed transmission.

7. A cutting machine of the class described having in combination a cutter, means for progressively feeding material to be cut past said cutter, mechanism for regulating the cutting speed of the cutter to conform to different lengths of cut, a variable speed transmission adjustable to afford different lengths of cut, mechanism for adjusting said variable speed transmission, means for regulating the speed of action of said last mentioned mechanism upon said variable speed transmission, and means automatically operable upon changes in the speed of operation of said material feeding means for altering the speed of action of said setting mechanism upon said variable speed transmission.

8. In a machine for cutting box blanks and the like from a continuous web moving at a substantially uniform speed of a cutting head having a cutter, driving means for the cutting head moving at a predetermined ratio to the speed of the feed, said ratio being substantially constant, means for connecting said drive to the cutting head to drive the same, comprising a plurality of variable speed units and means for adjusting each of said variable speed units independently of the other to determine the number of cycles per unit of time of the cutting head and to change the same to change the lengths of the blanks being cut, means for selectively connecting either of said variable speed units in driving relation to said head and simultaneously disconnecting the other said unit, whereby one said unit at a time operates the head, the other being free for adjustment, so that the speed of the head and the number of cutting cycles per unit of time may be instantly shifted from the cutting speed adapted to cut blanks of one length to a cutting speed adapted to cut blanks of a different predetermined length.

9. In a machine for cutting box blanks and the like from a continuously moving web of corrugated board or similar material, having a cutting head, including a cutter, means for feeding the web at a substantially constant speed driving means for the head operating at a constant speed ratio to said speed, said driving means including a plurality of Reeves drives, adapted to determine the number of cutting cycles per unit of time of the cutting head, whereby the lengths of the blanks cut is determined, means for alternately and separately connecting each of said Reeves drives in driving relation to said head and for simultaneously throwing the other Reeves drive out of driving relation thereto, one Reeves drive being rendered free for adjustment as to its speed ratio while the other continues in driving relation to the head, providing for the instantaneous shifting of the speed of the cutting head from the speed at which blanks of one length are cut to a different speed at which another blank of predetermined length is cut.

10. In a machine for cutting box blanks and the like from a continuous web moving at a substantially uniform speed a cutting head having a cutter, driving means for the cutting head moving at a predetermined ratio to the speed of the feed, said ratio being substantially constant, means for connecting said drive to the cutting head to drive the same comprising a plurality of variable speed units and means for adjusting each of said variable speed units independently of the other to determine the number of cycles per unit of time of the cutting head and to change the same to change the length of the blanks being cut, means for separately and selectively connecting each of said change speed units in driving relation to said head and simultaneously disconnecting the other change speed unit whereby either one of said units selected by the operator operates the head, the other being free for adjustment, so that the speed of the head and the number of cutting cycles per unit of time may be instantly shifted from the cutting speed adapted to blanks of one length to a cutting speed to cut blanks of a different predetermined length and means for changing the speed of the cutter in each cutting cycle to conform to the speed of the web.

HOBART W. BRUKER.